(12) United States Patent
Terrasse et al.

(10) Patent No.: US 10,486,651 B2
(45) Date of Patent: Nov. 26, 2019

(54) ADAPTER FOR A MOTOR VEHICLE WINDSCREEN WIPER

(71) Applicant: Valeo Systèmes d'Essuyage, Le Mesnil Saint Denis (FR)

(72) Inventors: William Terrasse, Vic-Le-Comte (FR); Guillaume Mouleyre, Saint Genès Champanelle (FR)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 40 days.

(21) Appl. No.: 15/334,418

(22) Filed: Oct. 26, 2016

(65) Prior Publication Data
US 2017/0120873 A1 May 4, 2017

(30) Foreign Application Priority Data

Nov. 4, 2015 (FR) ...................... 15 60591

(51) Int. Cl.
*B60S 1/38* (2006.01)
*B60S 1/40* (2006.01)
*B60S 1/42* (2006.01)

(52) U.S. Cl.
CPC ............. *B60S 1/3853* (2013.01); *B60S 1/381* (2013.01); *B60S 1/3874* (2013.01);
(Continued)

(58) Field of Classification Search
CPC ........ B60S 1/40; B60S 1/4045; B60S 1/4067; B60S 1/407; B60S 1/4074; B60S 1/4077;
(Continued)

(56) References Cited

U.S. PATENT DOCUMENTS

| | | | |
|---|---|---|---|
| 2007/0192984 A1* | 8/2007 | Park ...................... | B60S 1/4003 15/250.201 |
| 2013/0007977 A1* | 1/2013 | Depondt ................. | B60S 1/387 15/250.32 |

(Continued)

FOREIGN PATENT DOCUMENTS

| | | |
|---|---|---|
| CN | 102114827 A | 7/2011 |
| CN | 201923082 U | 8/2011 |

(Continued)

OTHER PUBLICATIONS

Machine translation of description portion of Korean publication 10-0678408, published Jan. 2007.*
First Office Action in corresponding Chinese Application No. 201610974006.8, dated Nov. 1, 2018 (18 pages).

*Primary Examiner* — Gary K. Graham
(74) *Attorney, Agent, or Firm* — Osha Liang LLP

(57) ABSTRACT

Adapter for a windscreen wiper (10), in particular a motor vehicle windscreen wiper, said adapter being intended to connect a wiper blade (12) to an end piece (28') of a first driving arm (14'), of the laterally locking type that is secured to a cylindrical rod (33) that defines an articulation axis of the adapter with respect to said blade, said adapter comprising a longitudinal body comprising two substantially parallel first longitudinal lateral walls that are connected together by a transverse wall, said body being connected at one longitudinal end to a cowling (46) that has a transverse dimension larger than that of said body, characterized in that said cowling has a transverse orifice configured to receive said cylindrical rod.

14 Claims, 3 Drawing Sheets

(52) U.S. Cl.
CPC ............... *B60S 1/3887* (2013.01); *B60S 1/40* (2013.01); *B60S 1/4003* (2013.01); *B60S 1/407* (2013.01); *B60S 1/4045* (2013.01); *B60S 1/4077* (2013.01); *B60S 1/42* (2013.01); *B60S 1/3851* (2013.01); *B60S 2001/4054* (2013.01)

(58) Field of Classification Search
CPC ............. B60S 1/4003; B60S 2001/408; B60S 1/4048; B60S 1/4038; B60S 2001/4054; B60S 2001/4051; B60S 1/3853; B60S 1/3851
USPC ...................................................... 15/250.32
See application file for complete search history.

(56) References Cited

U.S. PATENT DOCUMENTS

2013/0212825 A1* 8/2013 Lee ..................... B60S 1/3867
                                                     15/250.32
2013/0343811 A1 12/2013 Depondt

FOREIGN PATENT DOCUMENTS

| | | |
|---|---|---|
| CN | 202163402 U | 3/2012 |
| CN | 103097207 B | 7/2015 |
| EP | 2769889 A2 | 8/2014 |
| KR | 10-0678408 * | 1/2007 |

* cited by examiner

ADAPTER FOR A MOTOR VEHICLE WINDSCREEN WIPER

TECHNICAL FIELD

The present invention relates notably to an adapter for a windscreen wiper, in particular a motor vehicle windscreen wiper.

PRIOR ART

A motor vehicle is conventionally equipped with windscreen wipers for washing the windscreen and avoiding disruption to the driver's view of his surroundings. These windscreen wipers generally comprise a driving arm that carries out an angular back-and-forth movement, and elongate blades which themselves carry squeegee blades made of a resilient material. These squeegee blades rub against the windscreen and evacuate the water by removing it from the driver's field of view. The blades are produced in the form either, in a conventional version, of articulated brackets which hold the squeegee blade at a number of discrete locations, giving it a bend that allows it to follow whatever curvature the windscreen may have, or, in a more recent version, known as the "flat blade" version, of a semi-rigid assembly which holds the squeegee blade along its entire length by virtue of one or more bend-forming vertebrae making it possible to press the blade against the windscreen without having to use brackets.

In both solutions, the blade is attached to the driving arm by a connection system having a connector and an adapter. The connector is a piece which is secured to the blade and which is generally fastened directly to the squeegee blade or to the flat blade, whereas the adapter is secured to the arm. The adapter is an intermediate piece which allows the connector to be linked and fastened to the driving arm. It is generally configured to be inserted into a head or end piece, in the form of a yoke and having a shaped cross section, of the driving arm.

Each of these members (connector and adapter) comprises articulation means configured to cooperate with complementary means of the other member so as to define at least one transverse articulation axis of the members, which is an articulation axis of the blade with respect to the arm. In the current art, one of the members, such as the connector, generally comprises a substantially cylindrical physical pin which defines the articulation axis and is received in a housing of complementary shape in the other member.

The adapter generally has a body configured to be inserted into the end piece of the arm such that this body extends at least in part between two substantially parallel lateral walls of the end piece. The body of the adapter is connected at one end to a fairing or cowling, commonly referred to as a cap, against which the free end of the end piece comes into abutment. Lastly, the body of the adapter generally comprises an actuation button which is inserted by elastic snap-fitting into an orifice in a transverse wall of the end piece, when the latter is in abutment against the cap, in order to lock the adapter with respect to the end piece in this position.

An adapter makes it possible to join a blade to a particular type of end piece. In the case of the abovementioned end pieces with a U-shaped cross section, there are several varieties thereof.

A blade equipped with a laterally locking end piece also exists. This end piece is secured to a cylindrical rod that is intended to define said articulation axis, and is intended to be rotationally inserted into an orifice of complementary shape in the body of the adapter and into an orifice in the connector.

In the current art, there are as many varieties of adapter as there are varieties of end pieces, this being neither practical nor economical. There is thus a genuine need for a universal adapter that is able to be mounted on at least two, or even more, end pieces of wiper arms, and in particular on end pieces of different types.

The invention proposes a simple, effective and economical solution to this need.

SUMMARY OF THE INVENTION

To this end, the invention proposes an adapter for a windscreen wiper, in particular a motor vehicle windscreen wiper, said adapter being intended to connect a wiper blade to an end piece of a driving arm, of the laterally locking type that is secured to a cylindrical rod that defines an articulation axis of the adapter with respect to said blade, said adapter comprising a longitudinal body comprising two substantially parallel first longitudinal lateral walls that are connected together by a transverse wall, said body being connected at one longitudinal end to a cowling that has a transverse dimension larger than that of said body, characterized in that said cowling has a transverse orifice configured to receive said cylindrical rod.

The adapter according to the invention can be considered a universal adapter and can be used for example to attach a wiper blade to an end piece of the type having a U-shaped section or of the laterally locking type. The U-shaped end piece can be mounted on the body of the adapter, as explained above. The cylindrical rod of the laterally locking end piece can be inserted into the orifice in the adapter, it being possible for this end piece to bear against one of the walls of the cowling.

The adapter according to the invention may comprise one or more of the following features, taken individually or in combination with one another:

- said cowling comprises two substantially parallel second longitudinal lateral walls, through which said orifice passes,
- said second lateral walls are connected together by at least one transverse wall,
- said second lateral walls extend at least in part in a manner facing said first walls and are spaced apart from said first walls so as to define at least one housing intended to receive a longitudinal end of an end piece of a second driving arm having a substantially U-shaped cross section,
- said second lateral walls define a first longitudinal end portion of width L1 and a second, opposite longitudinal end portion of width L2, which is less than L1 and greater than the width of said body,
- said orifice is situated more or less at the junction between said first and second end portions,
- said first lateral walls are passed through by said orifice,
- said body comprises a transverse groove which extends in said transverse wall, between said first transverse walls,
- said groove extends close to a transverse plane that is perpendicular to a longitudinal axis of the adapter and passes substantially through said orifice,
- said first lateral walls comprise protruding ribs on external lateral faces,
- said body comprises elastically deformable means for elastic snap-fitting, and said adapter has connecting means configured to cooperate with said blade, said means comprise at least one actuation button that is situated in a hole or slot in said transverse wall.

The present invention also relates to an assembly comprising an adapter as described above and a driving arm, for a windscreen wiper, in particular a motor vehicle windscreen wiper.

Preferably, said arm is of the laterally locking type and is secured to a cylindrical rod, said arm having a lateral bearing face configured to cooperate with a lateral face of said cowling by bearing and/or sliding, and an L-shaped tab, one lip of which defines a lateral wall configured to cooperate with a lateral face of said body by bearing and/or sliding.

The present invention also relates to an assembly comprising an adapter as described above and a blade for a windscreen wiper, in particular a motor vehicle windscreen wiper.

DESCRIPTION OF THE FIGURES

The invention will be better understood and further details, features and advantages of the invention will become apparent from reading the following description given by way of non-limiting example and with reference to the appended drawings, in which.

DETAILED DESCRIPTION

It should be noted that the figures explain the invention in detail for implementing the invention, it being, of course, possible for said figures to serve to better define the invention if necessary.

In the following description, the terms "longitudinal" or "lateral" refer to the orientation of the wiper blade or of the driving arm according to the invention. The longitudinal direction corresponds to the main axis of the blade or arm along which it extends, while the lateral orientations correspond to concurrent straight lines, that is to say straight lines which cross the longitudinal direction, notably perpendicular to the longitudinal axis of the blade or arm in the plane in which it rotates. For longitudinal directions, the terms "outer" (or "rear") or "inner" (or "front") are to be assessed in relation to the point at which the blade is fastened to the arm, the term "inner" corresponding to the part where the arm and a half-blade extend, or in relation to the point at which the arm is fastened to the vehicle. Lastly, the directions referenced as being "upper" or "lower" correspond to orientations perpendicular to the plane of rotation of the wiper blade, the term "lower" containing the plane of the windscreen.

Figure 1:
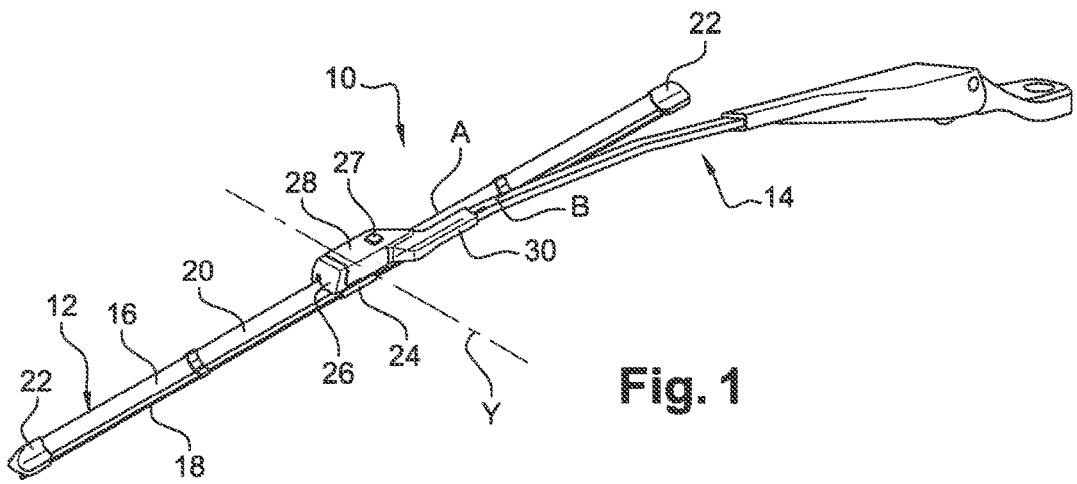
FIG. 1 is a schematic perspective view of a windscreen wiper, this windscreen wiper having a wiper blade, a driving arm for driving the blade, and a system for connecting the blade to the arm.

FIG. 1 illustrates a windscreen wiper 10 having notably a blade 12 and a driving arm 14 for driving the blade 12, The blade 12 is preferably of the flat-blade type and comprises a longitudinal body 16, a squeegee blade 18, generally made of rubber, and at least one vertebra (not visible) which stiffens the squeegee blade and encourages it to press against a vehicle windscreen.

The body 16 of the blade 12 may have an upper aerodynamic deflector 20 intended to improve the operation of the wiping system, the purpose of this deflector being to improve the pressing of the blade against the windscreen and thus the aerodynamic performance of the windscreen wiper.

The blade 12 may further comprise end fittings 22 or clips for attaching the squeegee blade 18 and the vertebra to the body 16, these fittings 22 being situated at each of the longitudinal ends of the body 16.

The blade 12 comprises an intermediate connector 24 substantially at its middle. An adapter 26 secured to the arm 14 is mounted on the connector 24 so as to maintain a degree of freedom to pivot about an articulation axis Y which is a transverse axis substantially perpendicular to the longitudinal axis of the blade 12. This degree of freedom allows the blade 12 to pivot with respect to the arm 14 and thus allows the blade to follow the curvature of the windscreen as it moves. The adapter 26 can be detached from the arm 14 by pressing an actuation button, in this case a push button 27, carried by the adapter.

The arm 14 is intended to be driven by a motor to follow a back-and forth angular movement that allows water and possibly other undesirable elements with which the windscreen is covered to be evacuated. The adapter 26 provides the connection of the blade 12 to the arm 14 and, in particular, to a head or end piece 28 of the arm which may be formed in one piece with the arm or be attached and fastened thereto.

Figure 2:
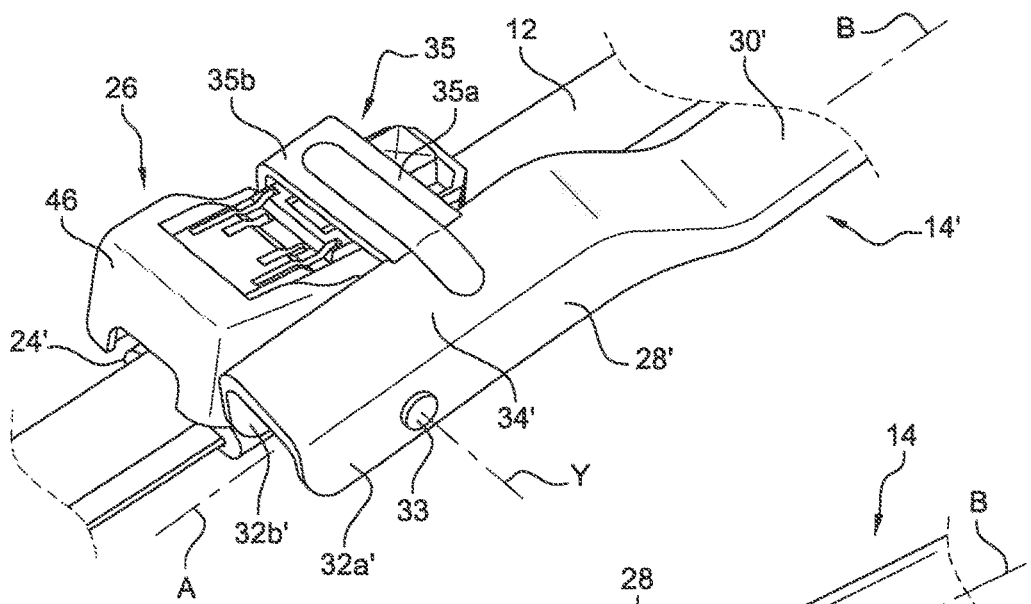
FIG. 2 is a schematic perspective view on a larger scale of a laterally locking arm and of a connection system having an adapter according to the invention.
Figure 3:
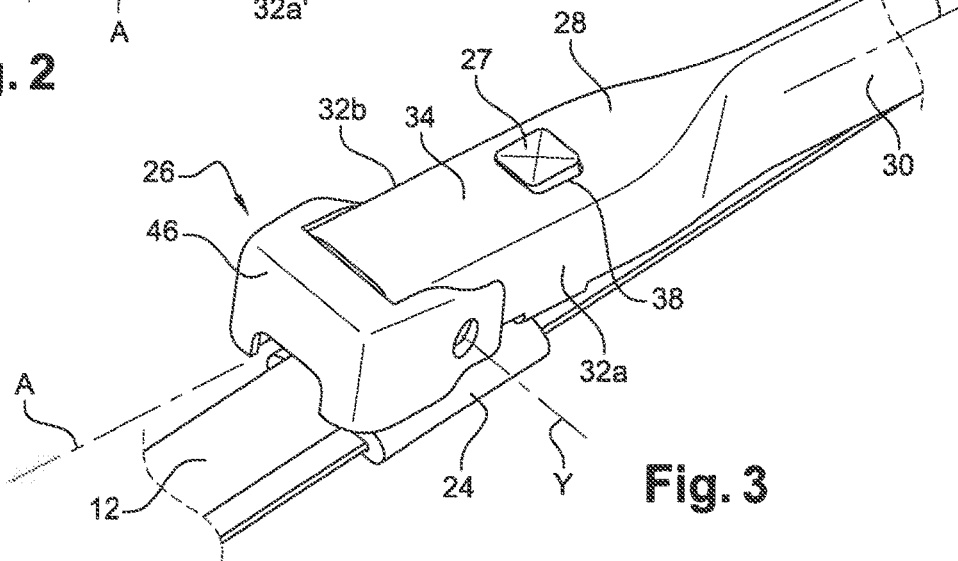
FIG. 3 is a schematic perspective view on a larger scale of an arm having a U-shaped yoke and of the connection system having the adapter according to the invention.

In the example shown, the adapter 26 can be connected to an end piece 28' of a first arm 14', of the vertically locking type, shown in FIG. 2, and to an end piece 28 of a second arm 14, visible in FIG. 3, which forms a yoke with a substantially U-shaped cross section.

In FIG. 2, the end piece 28' has an elongate shape, the axis of elongation A of which is generally substantially parallel to the axis of elongation or longitudinal axis of the blade 12. The end piece 28' comprises a part 30' for connecting to the rest of the arm 14', for example by crimping. This part 30' has an elongate overall shape and extends along an axis B substantially parallel to the axis A and at a distance from this axis. The part 30' is connected to a rear end or inner end of the rest of the end piece 28'.

The end piece 28' comprises two lateral walls 32a', 32b', the upper longitudinal edges of which are connected together by an upper transverse wall 34'. The walls 32a', 32b' are secured to a cylindrical rod 33 which extends between the walls 32a', 32b' and extends laterally or transversely beyond one of the walls (namely the wall 32b' in the example shown FIGS. 7 and 8). The rod 33 defines or extends along the articulation axis Y.

The end piece 28', and in particular its upper wall 34', comprises an L-shaped lateral tab or extension 35. This tab 35 comprises a first portion 35a that is parallel to the upper wall 34' and extends laterally in line with the latter. It has an elongate shape, one longitudinal end of which is connected to the upper wall and the opposite longitudinal end of which is connected to a second portion 35b or a lip substantially perpendicular to the first portion.

Figure 7:
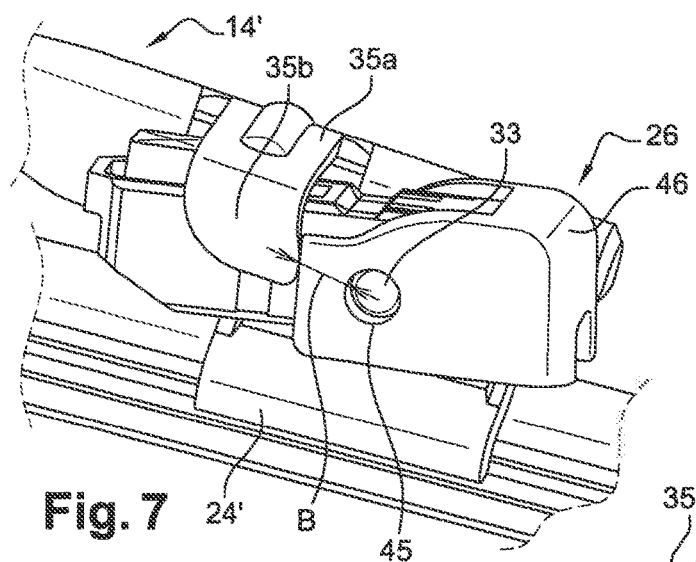
FIGS. 7 and 8 are schematic perspective views of the arm and of the connection system from FIG. 2, and FIGS. 9 and 10 are schematic perspective views of the arm and of the adapter from FIG. 3.
Figure 8:
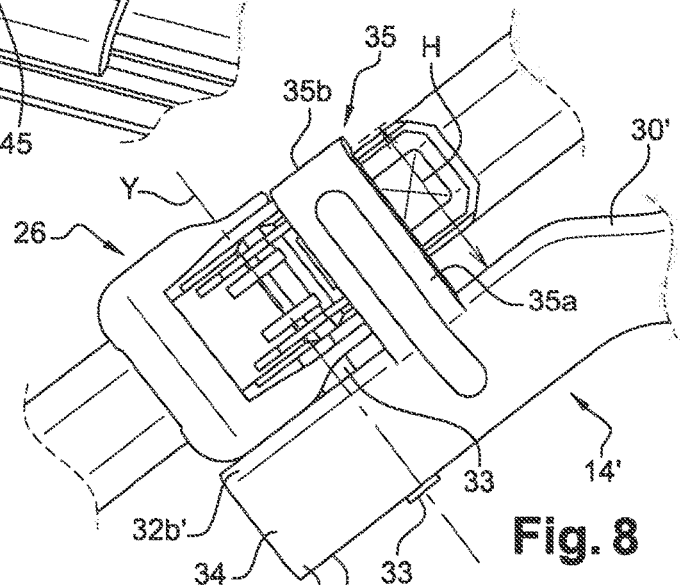

The lip 35b extends substantially in a manner facing the lateral wall 32b' and is situated at a transverse distance H from this wall. This distance H is measured between the facing lateral faces of the lip 35b and the wall 32b' (FIG. 8). The distance H is measured along the axis Y. The shortest distance between the lip 35b and the rod 33, measured in the plane of said lip 35b, is denoted B (FIG. 7).

In FIG. 3, the end piece 28 has an elongate shape, the axis of elongation A of which is generally substantially parallel to the axis of elongation or longitudinal axis of the blade 12, The end piece 28 comprises a part 30 for connecting to the rest of the arm 14, for example by crimping. This part 30 has an elongate overall shape and extends along an axis B substantially parallel to the axis A and at a distance from this axis. The part 30 is connected to a rear end or inner end of the rest of the end piece 28.

Figure 10:
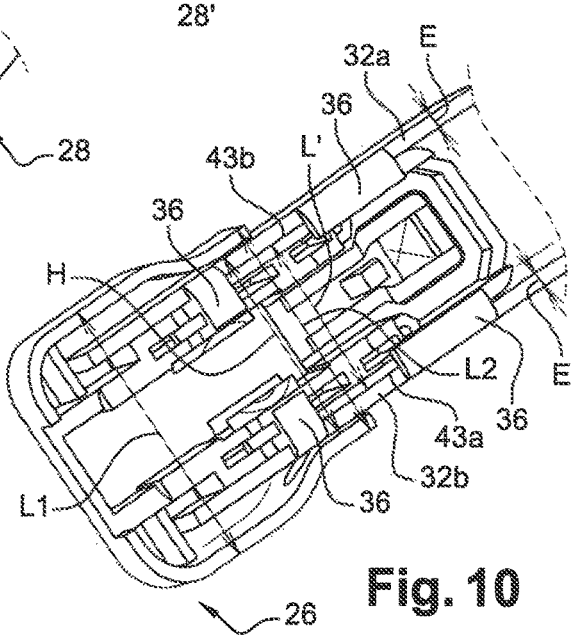

The end piece 28 comprises two lateral walls 32a, 32b, the upper longitudinal edges of which are connected together by an upper transverse wall 34. Between them, the walls 32a, 32b and the wall 34 delimit a space for accommodating the adapter 26. At their lower longitudinal edges, the walls 32a, 32b comprise means 36, such as hooks, for retaining the adapter 26 in the abovementioned space (FIG. 10).

The upper wall 34 comprises a through-opening 38 with a shape complementary to the push button 27. In the mounted position, the push button 27 is accommodated in this opening 38 and can pass through the latter so as to protrude from the upper face of the wall 34. The push button 27 is mounted in the opening 38 by simple insertion or fitting, preferably by elastic snap-fitting.

L is defined as being the width or lateral dimension of the end piece 28, this (external) width L being measured between the walls 32a, 32b and more precisely between the external faces thereof. The internal width L' is measured between the internal faces of the walls 32a, 32b. All widths are measured in a direction substantially perpendicular to the axis A and parallel to the wall 34. Moreover, E defines the thickness of each wall 32a, 32b, this amounting to the thickness of the metal sheet used to manufacture the end piece when the latter is obtained by stamping, According to the invention and as shown in FIGS. 2 and 3, the adapter 26 is of the "universal" type and is intended to be mounted on either one of the end parts 28, 28'.

Figure 4:
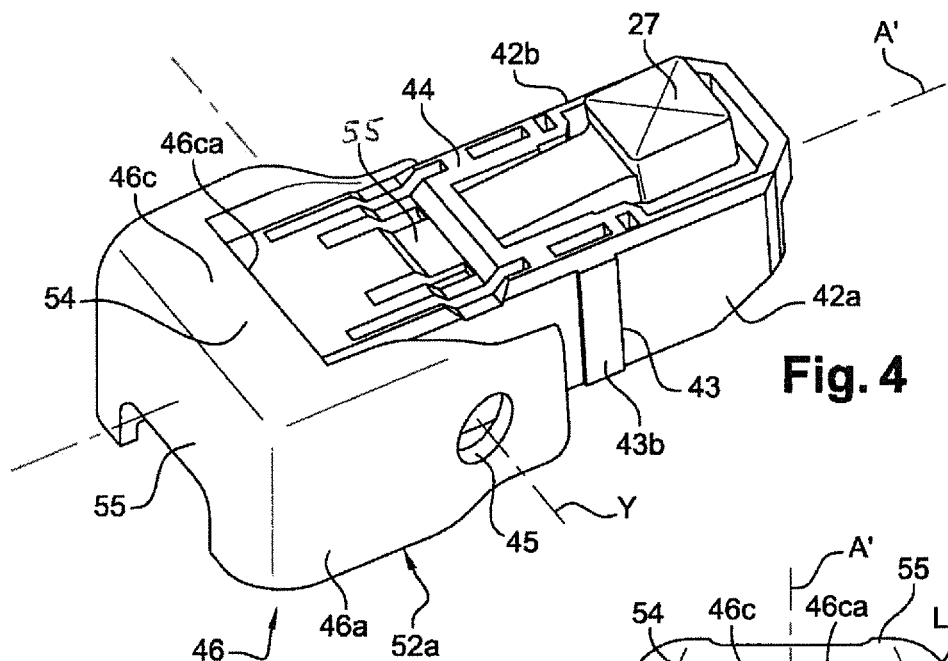
FIGS. 4 to 6 are schematic views of the adapter according to the invention.
Figure 5:
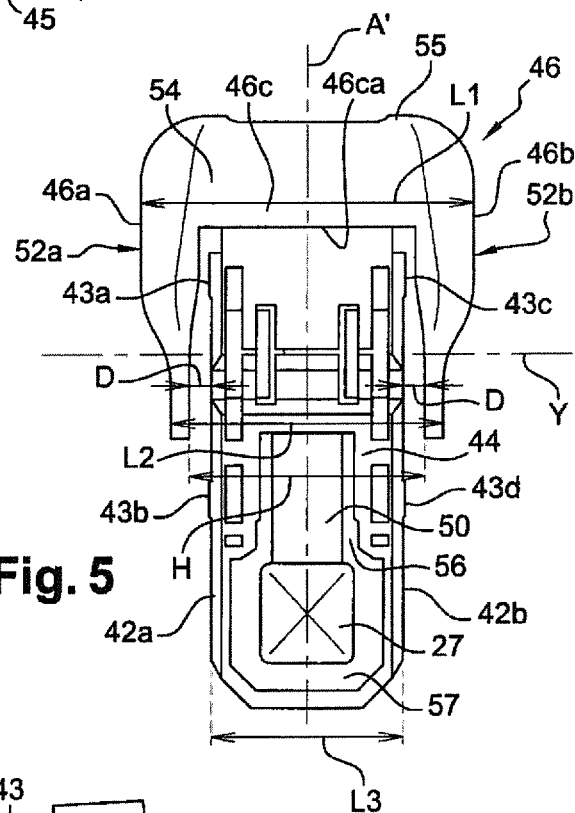
Figure 6:
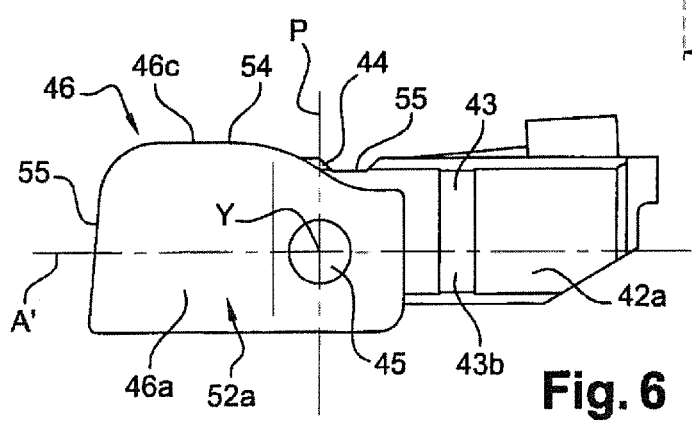

The adapter 26, which can be seen more clearly in FIGS. 4 to 6, has an elongate overall shape along the axis A'. It comprises a body having two lateral walls 42a, 42b, which are substantially parallel to one another and to the axis A' and are at a distance from one another. These walls 42a, 42b are connected together at their upper ends by an upper transverse wall 44 that is substantially perpendicular to the walls 42a, 42b. The walls 42a, 42b, 44 in this case have an elongate shape in the longitudinal direction.

Figure 9:
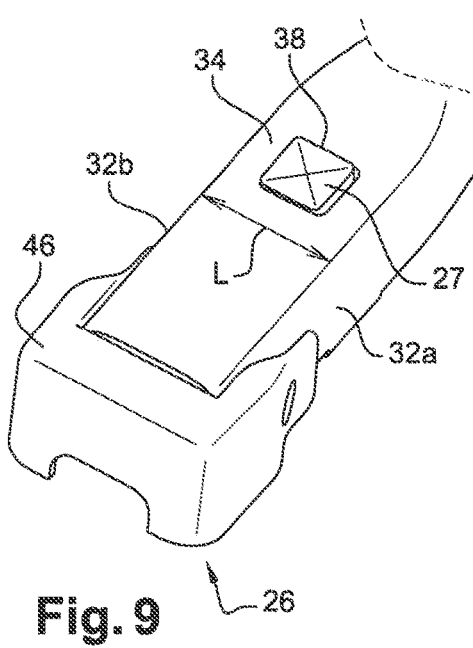

The walls 42a, 42b, 44 of the adapter 26 define between one another a longitudinal space in which a part of the connector 24, 24' is intended to be mounted. In the case in FIGS. 3, 9 and 10, the connector 24 bears a substantially cylindrical transverse pivot pin which is intended to be fitted by elastic snap-fitting in housings having a shape complementary to the walls 42a, 42b of the body of the adapter 26. In the case in FIGS. 2, 7 and 8, the connector 24' comprises a through-orifice which is intended to be aligned with an orifice 45 in the adapter and to receive the cylindrical rod 33 of the end piece 28' of the arm 14'.

The body of the adapter 26 is connected, at a first of its longitudinal ends, to a fairing or cowling 46, also referred to as a cap. This cowling 46 has a lateral or transverse dimension greater than that of the body of the adapter and a height that is likewise greater than that of the body. The lateral walls 42a, 42b of the body of the adapter are thus set back or offset with respect to (external) lateral faces 46a, 46b of the cowling 46, and its upper wall 44 is set back or offset with respect to an (external) upper face 46c of the cowling.

The upper face 46c of the cowling 46 is connected to the upper wall 44 of the body by a rear face 46ca which also extends perpendicularly to the axis A'.

The rear face 46ca of the cap 46 forms a bearing face for the outer end or front end of the end piece 28. More specifically, in the mounted position of the adapter 26 in the end piece 28, the front free edge of the upper wall 34 of the end piece 28 is intended to bear against the face 48 (FIG. 3).

The upper wall 44 of the body of the adapter 26 comprises two mutually parallel longitudinal slots 56 of axis A' that are spaced apart from one another. They define a longitudinal tongue 50 between one another. This tongue 50 is elastically deformable and is connected at its rear free end to the abovementioned push button 27. In the free state without constraint, the tongue 50 is such that the push button 27 protrudes from the upper wall 44. The push button 27 is situated in a housing 57 in the upper wall 44 of the body, connected to the abovementioned slots 56.

The cowling 46 comprises lateral walls 52a, 52b that are substantially parallel to one another and to the axis A. These walls extend on either side of the body and are spaced apart laterally from this body so as to allow the lateral walls 32a, 32b of the end piece 28 to be fitted between the body and the lateral walls 52a, 52b.

The walls 52a, 52b are connected together at their upper ends by an upper transverse wall 54 that is substantially perpendicular to the wall 52a, 52b, The walls 52a, 52b in this case have an elongate shape in the longitudinal direction. The walls 52a, 52b are also connected together at their front or outer ends by a front transverse wall 55 that is substantially perpendicular to the walls 52a, 52b.

The walls 52a, 52b extend rearwards from the front wall 55. The walls 52a, 52b are spaced apart laterally from the lateral walls 42a, 42b of the body and define with the latter lateral housings for receiving the lateral walls of the end piece 28.

The wall 52a faces the wall 42a of the body and is spaced apart therefrom by a transverse distance D that is greater than or equal to E. The wall 52b faces the wall 42b of the body and is spaced apart therefrom by one and that same transverse distance D that is greater than or equal to E.

Furthermore, the maximum distance or lateral dimension between the external faces 46a, 46b of the lateral walls 52a, 52b of the cowling is denoted L1, and the minimum distance or lateral dimension between the (internal faces of the) lateral walls 52a, 52b is denoted H.

In the example shown, H is greater than or equal to L. In addition, D is greater than E.

The lateral walls 52a, 52b define a first longitudinal end portion of width L1 and a second, opposite longitudinal end portion of width L2, which is less than L1. L1 and L2 are greater than L and than the width L3 of the body.

The walls 52a, 52b each comprise a portion of the orifice 45 defining the axis Y. As can be seen notably in FIG. 6, the walls 52a, 52b and 42a, 42b comprise portions of orifice 45. In other words, they are passed through by the same orifice 45, which defines the articulation axis Y.

In the example shown, the orifice 45 is situated more or less at the junction between said first and second end portions of the walls 52a, 52b.

The body in this case comprises a transverse groove 55 which extends in the upper wall 44, between the lateral walls 42a, 42b. This groove 55 extends close to a transverse plane P that is perpendicular to the longitudinal axis A' of the adapter and passes substantially through the orifice 45.

In addition, the lateral walls 42a, 42b comprise protruding ribs 43 on their external lateral faces. Each wall 42a, 42b comprises two protruding ribs that are spaced apart longitudinally from one another and define lateral faces 43a, 43b, 43c, 43d that are intended to cooperate with the end piece 28 or 28' by sliding. The front 43a, 43c and rear 43b, 43d sliding faces preferably cooperate with the internal faces of the lateral walls 32a, 32b of the end piece 28. L' is then substantially equal to L3. The external faces of these walls 32a, 32b can cooperate with the internal faces of the second end portions of the cowling 46 by sliding.

When the adapter 26 has been inserted into the end piece 28, by axial translational movement, from the front to the rear, along the axis A, the walls 32a, 32b of the end piece 28 extend on either side of the body of the adapter and are flush with the lateral walls 42a, 42b thereof, or are even in contact with the latter. The hooks 36 of the end piece are fitted under the body of the adapter in order to keep it in the end piece 28. Lastly, the end piece 28 bears by way of the front edge of its upper wall 34 against the rear face 46ca of the cowling 46, and the push button 27 is fitted in the opening 38 in the end piece. In the mounted position, the axes A and A' are substantially coincident.

As can be seen in FIGS. 7 and 8, the lateral wall 32b' of the end piece 28' is intended to cooperate with the external lateral face 46a of the lateral wall 52a of the cowling 46 by sliding. The lip 35b of the end piece 28' is intended to cooperate with the rear face 43d of the lateral wall 42b of the body of the adapter 26 by sliding. The arm 14' is mounted on the adapter 26 in the following manner. The end piece 28' is disposed on the side of the adapter 26 and the cylindrical rod 33 is aligned with the orifice 45 in the adapter 26. The end piece is moved towards the adapter by translational movement along the axis Y, the end piece being oriented about the axis Y with respect to the adapter such that its lip 35b passes over the upper wall 44 of the body. This is allowed by the abovementioned distance B. This translational movement is carried out until the lateral wall 32b' bears laterally against the face 46a of the cowling. The arm 14' is then moved in rotation about the axis Y with respect to the adapter 26, until the lip 35b cooperates with the rear face 43d of the body by sliding, as is shown in FIGS. 7 and 8. H is substantially equal to L3+((L1−L3)/2) such that the wall 32b' and the lip 35b of the end piece 28' cooperate with the faces 46a, 43d, respectively, of the adapter 26. In the mounted position, the axes A and A' are parallel to and at a distance from one another.

The invention claimed is:

1. An adapter for a motor vehicle windscreen wiper, said adapter being for connecting a wiper blade to an end piece of a first driving arm, that is secured to a cylindrical rod that defines an articulation axis of the adapter with respect to said blade, said adapter comprising:
   a longitudinal body extending in a longitudinal direction and comprising two substantially parallel first longitudinal lateral walls that are connected together by a transverse upper wall,
   said body being connected at one longitudinal terminal end thereof to a cowling that has a transverse dimension larger than that of said body,
   wherein said cowling has a transverse orifice configured to receive said cylindrical rod, and
   wherein said body comprises an elastically deformable tongue spaced apart from the cowling for elastic snap-fitting the end piece onto the body an upper face of the cowling is connected to the upper wall, at one end of the upper face, by a rear face of the cowling extending perpendicular to the longitudinal direction.

2. The adapter according to claim 1, wherein said cowling comprises two substantially parallel second longitudinal lateral walls, through which said orifice passes.

3. The adapter according to claim 2, wherein said second lateral walls are connected together by at least one transverse wall.

4. The adapter according to claim 1, wherein said first lateral walls are passed through by said orifice.

5. The adapter according to claim 1, wherein said body comprises a transverse groove which extends in said transverse wall, between said first lateral walls.

6. The adapter according to claim 5, wherein said groove extends close to a transverse plane that is perpendicular to a longitudinal axis of the adapter and passes substantially through said orifice.

7. The adapter according to claim 1, wherein said first lateral walls comprise protruding ribs on external lateral faces.

8. The adapter according to claim 1, wherein said tongue comprises at least one actuation button that is situated in a hole or slot in said transverse wall.

9. An assembly comprising:
   an adapter according to claim 1; and
   a driving arm for a motor vehicle windscreen wiper.

10. The assembly according to claim 9, wherein said arm is secured to the cylindrical rod and is laterally locked with the cylindrical rod, said arm having a lateral wall configured to cooperate with an external lateral face of said cowling by bearing and/or sliding, and an L-shaped tab, one lip of which defines a lateral bearing face configured to cooperate with a lateral face of said body by bearing and/or sliding.

11. An assembly comprising:
    an adapter according to claim 1; and
    a blade for a motor vehicle windscreen wiper.

12. An adapter for a motor vehicle windscreen wiper, said adapter being for connecting a wiper blade to an end piece of a first driving arm, that is secured to a cylindrical rod that defines an articulation axis of the adapter with respect to said blade, said adapter comprising:
    a longitudinal body extending in a longitudinal direction and comprising two substantially parallel first longitudinal lateral walls that are connected together by a transverse upper wall,
    said body being connected at one longitudinal terminal end thereof to a cowling that has a transverse dimension larger than that of said body,
    wherein said cowling has a transverse orifice configured to receive said cylindrical rod,
    wherein said body comprises elastically deformable means for elastic snap-fitting,
    wherein an upper face of the cowling is connected to the upper wall, at one end of the upper face, by a rear face of the cowling extending perpendicular to the longitudinal direction
    wherein said cowling comprises two substantially parallel second longitudinal lateral walls, through which said orifice passes, and
    wherein said second lateral walls extend at least in part in a manner facing said first walls and are spaced apart from said first walls so as to define at least one housing intended to receive a longitudinal end of an end piece of a second driving arm having a substantially U-shaped cross section.

13. An adapter for a motor vehicle windscreen wiper, said adapter being for connecting a wiper blade to an end piece of a first driving arm, that is secured to a cylindrical rod that defines an articulation axis of the adapter with respect to said blade, said adapter comprising:
- a longitudinal body extending in a longitudinal direction and comprising two substantially parallel first longitudinal lateral walls that are connected together by a transverse upper wall,
- said body being connected at one longitudinal terminal end thereof to a cowling that has a transverse dimension larger than that of said body,
- wherein said cowling has a transverse orifice configured to receive said cylindrical rod,
- wherein said body comprises elastically deformable means for elastic snap-fitting,
- wherein an upper face of the cowling is connected to the upper wall, at one end of the upper face, by a rear face of the cowling extending perpendicular to the longitudinal direction
- wherein said cowling comprises two substantially parallel second longitudinal lateral walls, through which said orifice passes, and
- wherein said second lateral walls define a first longitudinal end portion of width L1 and a second, opposite longitudinal end portion of width L2, which is less than L1 and greater than the width of said body.

14. The adapter according to claim 13, wherein said orifice is situated at the junction between said first and second end portions.

* * * * *